United States Patent [19]

Takekoshi et al.

[11]  4,293,683

[45]  Oct. 6, 1981

[54] METHOD FOR MAKING POLYETHERIMIDES USING CARBOXYLIC ACID SALTS OF ALKALI METALS OR ZINC AS CATALYSTS

[75] Inventors: Tohru Takekoshi, Scotia; Howard J. Klopfer, Clifton Park, both of N.Y.

[73] Assignee: General Electric Company, Schenectady, N.Y.

[21] Appl. No.: 168,660

[22] Filed: Jul. 11, 1980

[51] Int. Cl.³ .................... C08G 69/04; C08G 73/10
[52] U.S. Cl. ...................... 528/180; 528/26; 528/179; 528/181; 528/182; 528/185
[58] Field of Search .............. 528/179, 180, 181, 182, 528/185, 26

[56] References Cited

U.S. PATENT DOCUMENTS

| | | | |
|---|---|---|---|
| 3,803,085 | 4/1974 | Takekoshi et al. | 528/185 |
| 3,847,867 | 11/1974 | Heath et al. | 528/185 |
| 3,905,942 | 9/1975 | Takekoshi et al. | 528/185 |
| 3,983,093 | 9/1976 | Williams et al. | 528/185 |
| 3,989,670 | 11/1976 | Takekoshi et al. | 528/185 |
| 4,221,897 | 9/1980 | Takekoshi | 528/179 |

*Primary Examiner*—Howard E. Schain
*Attorney, Agent, or Firm*—William A. Teoli; James C. Davis, Jr.

[57] ABSTRACT

A method is provided for enhancing the rate of formation of polyetherimides under melt or solution polymerization conditions by using either an alkali metal carboxylic acid salt, or a zinc carboxylic acid salt as a catalyst. The aforementioned catalysts are employed in a polymerization mixture of aromatic bis(ether anhydride) and an organic diamine.

10 Claims, No Drawings

METHOD FOR MAKING POLYETHERIMIDES USING CARBOXYLIC ACID SALTS OF ALKALI METALS OR ZINC AS CATALYSTS

BACKGROUND OF THE INVENTION

The present invention relates to a method for making polyetherimides by effecting reaction between an aromatic bis(ether anhydride) and an organic diamine under melt or solution polymerization conditions. More particularly, the present invention relates to the use of carboxylic acid salts of Group IA metal or carboxylic acid salts of Group IIB.

Prior to the present invention, certain catalysts such as sodium chloride and ferric sulfate, as shown by Williams et al U.S. Pat. No. 3,998,840, assigned to the same assignee as the present invention, were used to enhance the rate of formation of polyetherimide under melt polymerization conditions. Although valuable results were achieved by such procedures, it was found that the aforementioned catalysts were either less or not effective when utilized for making polyetherimides from aromatic bis(ether anhydride) and organic diamine under solution polymerization conditions. In addition, the presence of such ions, as chloride can interfere with the use of such polyetherimide in electrical applications. Various metal compounds were also used to catalyze polyetherimide formation by imideamine exchange reactions, as shown by U.S. Pat. No. 3,847,870, Takekoshi and U.S. Pat. No. 3,850,885, Takekoshi et al, assigned to the same assignee as the present invention. However, the nature of the polymerization is quite different from polyetherimide formation by the melt polymerization of aromatic bis(ether anhydrode) and organic diamine, which is amine-anhydride interaction rather than imideamine exchange.

STATEMENT OF THE INVENTION

The present invention is based on the discovery that carboxylic acid salts of Group IA alkali metals and carboxylic acid salts of Group IIB metals such as zinc, when utilized in an effective amount, can enhance the rate of polyetherimide formation under melt polymerization conditions or solution polymerization conditions from mixtures of aromatic bis(ether anhydride) and organic diamine.

There is provided by the present invention a method for making polyetherimide consisting essentially of chemically combined units of the formula,

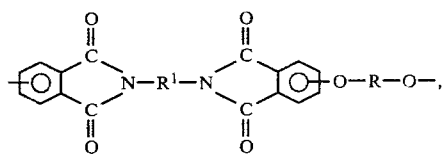

where R is a divalent aromatic organic radical having from 6-30 carbon atoms, $R^1$ is a divalent organic radical selected from R radicals, alkylene radicals having from 2-20 carbon atoms, cycloalkylene radicals, and $C_{(2-8)}$ alkylene terminated polydiorganosiloxane radicals, which comprises effecting the reaction under melt polymerization conditions or solution polymerization conditions, between an aromatic bis(ether anhydride) of the formula,

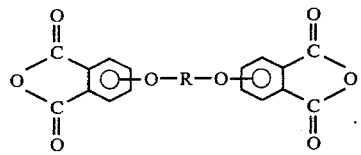

and an organic diamine of the formula, $$H_2NR^1NH_2, \qquad (3)$$

in the presence of a metal catalyst selected from the class consisting of sodium carboxylic acid salt and zinc carboxylic acid salt.

Radicals included by R are, for example, aromatic hydrocarbon radicals and halogenated aromatic hydrocarbon radicals, for example, phenylene, tolylene, chlorophenylene, naphthalene, etc., and radicals included by the formula,

where $R^2$ is a divalent aromatic radical having 6–13 carbon atoms selected from hydrocarbon radicals and halogenated hydrocarbon radicals, and Q is a divalent organo radical selected from

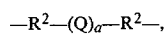

where a is 0 or 1, y is an integer having a value of from 1–5 inclusive, and $R^3$ is a monovalent hydrocarbon radical selected from methyl, phenyl, etc.

Radicals included by $R^1$ are, for example,

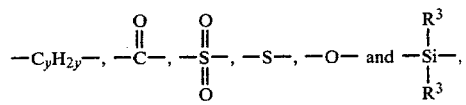

etc.; alkylene radicals such as hexamethylene, etc., cyclohexylene, etc.

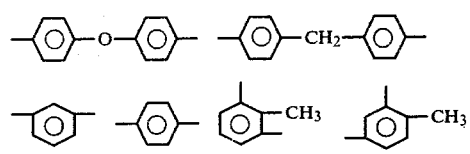

where R is as defined above, m is equal to 0 to 100 inclusive and n is 2–8 inclusive.

Included by the aromatic bis(ether anhydride) of formula (2) which can be used in the practice of the present invention are, for example,

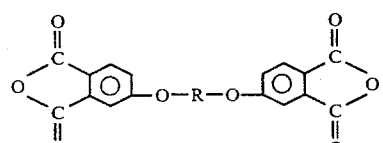

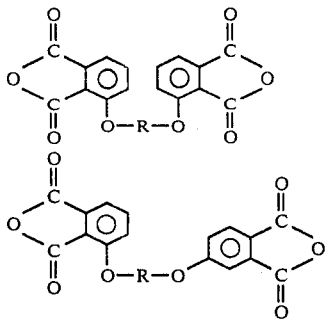

where R is as defined above.

Dianhydrides included by formula (5) are, for example, 2,2'-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)diphenylsulfone dianhydride; etc.

Dianhydrides included by formulas (4) and (6) are, for example, 2,2-bis[4-(3,4-dicarboxyphenoxy)-phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)diphenylsulfone dianhydride;
4-(2,3-dicarboxyphenoxy)-4'-(3,4-dicarboxyphenoxy)-2,2-diphenylpropane dianhydride, etc.

Included by the organic diamines of formula (3) are, for example, m-phenylenediamine;
p-pheylenediamine;
4,4'-diaminodipheylpropane;
4,4-diaminodiphenylmethane;
benzidine;
4,4'-diaminodiphenyl sulfide;
4,4'-diaminodiphenylsulfone;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butylphenyl)ether;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis-(3-aminopropyl)tetramethyldisiloxane;
bis-(4-aminobutyl)tetramethyldisiloxane; etc.

Some of the alkali metal carboxylic acid salts which can be utilized in the practice of the method of the present invention are, for example, disodium phthalate;
potassium hydrogen phthalate
sodium benzoate;
sodium acetate;
lithium caproate;
sodium salts of 2,2-bis[4-(3,4-dicarboxyphenoxy)-phenyl]propane (BPA-TA);

In addition, some of the Group IIB metal salts which can be utilized are, for example, zinc acetate, cadmium acetate, zinc stearate, etc.

In the practice of the invention, the aromatic bis(ether anhydride) and the organic diamine are blended thoroughly together with an effective amount of the metal salt catalyst, which hereinafter will signify either an alkali metal carboxylic acid salt, or a Group IIB metal carboxylic acid salt. The term "effective amount" of catalyst indicates that the metal salt catalyst can be utilized at from 0.0001% to 1% and preferably from 0.001% to 0.01% by weight based on the total weight of metal salt, aromatic bis(ether anhydride) and organic diamine. Aqueous solutions or suspensions of the catalyst can be used to insure that the catalyst is evenly distributed throughout the mixture of reactants. If desired, a chain-stopper, such as phthalic anhydride, also can be used.

Depending upon whether the polymerization is conducted under melt conditions or in solution, the temperature of the polymerization reaction can vary. For example, under melt polymerization conditions, the reactants can be heated to a temperature of from 200° C. to 400° C. in a suitable agitator under an inert atmosphere to effect the formation of polyetherimide. A nitrogen atmosphere can be employed and suitable reactors for a batch process include, for example, a Helicon Mixer, a Brabender mixer, etc., while extruders can be used for a continuous process.

Under solution polymerization conditions, reaction can be effected at a temperature in the range of from 120° C. to 300° C. in the presence of an organic solvent. Suitable organic solvents which can be utilized are, for example, toluene, xylene, trimethylbenzenes, chlorobenzene, dichlorobenzenes, trichlorobenzenes, ethylbenzene, benzonitrile, nitrobenzene, dimethylsulfoxide, N,N-dimethylformamide, N-methylpyrrolidone and mixtures thereof.

In instances where chain-stoppers are employed, there can be used substantially equal molar amounts of aromatic bis(ether anhydride) and organic diamine, for example, at from 1 mole percent to about 10 mole percent, based on the total moles of aromatic bis(ether anhydride) used in the melt polymerization or solution polymerization mixture.

In order that those skilled in the art will be better able to practice the invention, the following examples are given by way of illustration and not by way of limitation. All parts are by weight.

EXAMPLE 1

A polymerization rate study was made involving the use of various carboxylic acid salts of sodium and zinc as catalysts for the melt polymerization of 2,2-bis[4-(3,4-dicarboxyphenoxy)phenyl]propane dianhydride (BPA-DA) and metaphenylene-diamine (MPD), as follows:

A mixture of 81.14 parts of BPA-DA, 17.38 parts of MPD and 1.428 part of phthalic anhydride was placed in a Helicon Vertical mixer and was stirred under an argon atmosphere. The mixture was heated at 280° C. for up to 70 minutes. Polymerization advancement was followed by measuring the change in intrinsic viscosity of samples withdrawn at specific intervals during the polymerization. Samples were withdrawn after 10 minutes, 15 minutes, 45 minutes and 55 minutes. The same procedure was repeated except that various carboxylic acid salts of sodium or zinc were incorporated into the polymerization mixture at different concentrations to determine whether the presence of such catalysts would enhance the rate of polymerization. The following results were obtained:

TABLE I

| Catalyst | Catalyst Conc. (Wt %) | Intrinsic Viscosity $(d^l/g)$* | | | |
|---|---|---|---|---|---|
| | | 10 Min | 25 Min | 45 Min | 55 Min |
| None | 0 | 0.30 | 0.34 | 0.46 | 0.48 |
| $CH_3CO_2Na$ | 0.5 | 0.43 | 0.45 | | 0.46 |
| $C_6H_5CO_2Na$ | 0.5 | 0.45 | 0.46 | | 0.46 |
| Monosodium Phthalate | 0.1 | 0.44 | 0.47 | | 0.49 |
| Disodium Phthalate | 0.1 | 0.45 | 0.47 | | 0.49 |
| $Na_1$ . BPA-TA** | 0.5 | 0.46 | 0.50 | | 0.55 |
| $Na_2$ . BPA-TA** | 0.5 | 0.48 | 0.49 | | 0.55 |
| " | 0.05 | 0.36 | 0.51 | | 0.53 |
| " | 0.01 | 0.30 | 0.38 | | 0.49 |
| $Na_4$ . BPA-TA** | 0.05 | 0.43 | 0.50 | | 0.52 |
| $Na_2$ . EDTA | 0.5 | 0.42 | 0.42 | | 0.48 |
| $ZN(CH_3CO_2)_2$*** | 0.5 | 0.40 | 0.43 | | 0.50 |
| " | 0.2 | 0.34 | 0.41 | | 0.52 |

*Measured in chloroform at 25° C.
**BPA-TA: 2,2-bis[4(3,4-dicarboxyphenoxy(phenyl]propane
***dihydrate The above results show that sodium carboxylic acid salts and zinc carboxylic acid salts are valuable catalysts for enhancing the melt polymerization rate of mixtures of BPA-DA and MPD.

EXAMPLE 2

A study was also performed to determine the effectiveness of alkali metal carboxylic acid salts as rate enhancement catalysts for the solution polymerization of BPA-DA and MPD. The solvent utilized in the study was o-dichlorobenzene. In addition to evaluating the effectiveness of alkali metal carboxylic acid salts, a comparison of such salts to sodium chloride was also made as follows:

A mixture of 36.443 parts of BPA-DA, 7.5698 parts of MPD and 108 parts of o-dichlorobenzene was stirred and heated to reflux under nitrogen. The water formed was continuously removed by recirculating the o-dichlorobenzene through a bed of molecular sieve. The rate of increase of molecular weight was followed by measurement of intrinsic viscosity against time. The results obtained are shown below in Table II.

TABLE II

| Catalyst | Catalyst concentration | | | Intrinsic Viscosity $(dl/g)$*** at | | |
|---|---|---|---|---|---|---|
| | Salt PPM* | Metal PPM* | Mole** % | 1 hour | 2 hours | 3 hours |
| None | 0 | 0 | 0 | 0.25 | 0.30 | 0.33 |
| NaCl | 25.4 | 10 | 0.0257 | 0.27 | 0.32 | 0.36 |
| $Na_2$BPA-TA | 130 | 10 | 0.0129 | 0.32 | 0.50 | 0.62 |
| Potassium hydrogen phthalate | 88.7 | 17 | 0.0257 | 0.49 | 0.60 (80 min) | — |
| $C_5H_{11}CO_2Li$ | 53 | 3 | 0.0257 | 0.33 | 0.46 | 0.61 |

*Based on polymer weight
**Based on monomer moles
***Measured in chloroform at 25° C.

The above results show that alkali metal carboxylic acid salts can be effective as catalysts for the enhancement of the solution polymerization of polyetherimide and are superior to sodium chloride as rate enhancement catalysts.

Although the above examples are directed to only a few of the very many variables involved in the method of the present invention, it should be understood that the present invention is directed to a much broader method of making polyetherimides, utilizing aromatic bis(ether anhydride)s of formula (2) and organic diamines of formula (3) as well as a variety of alkali metal carboxylic acid salts or zinc carboxylic acid salts as previously defined.

What we claim as new and desire to secure by Letters Patent of the United States is:

1. A method for making polyetherimide consisting essentially of chemically combined units of the formula,

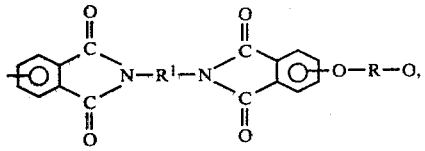

which comprises effecting the reaction under melt polymerization conditions or solution polymerization conditions, between an aromatic bis(ether anhydride) of the formula,

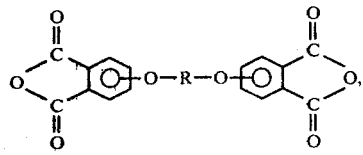

and an organic diamine of the formula,

$H_2NR^1NH_2$, in the presence of a metal catalyst selected from the class consisting of Group IA metal carboxylic acid salts and Group IIB metal carboxylic acid salts, where R is a divalent aromatic organic radical having from 6-30 carbon atoms, $R^1$ is a divalent organic radical selected from R radicals, alkylene radicals having from 2-20 carbon atoms, cycloalkylene radicals, and $C_{(2-8)}$ alkylene terminated polydiorganosiloxane radicals.

2. A method in accordance with claim 1, where the aromatic bis(ether anhydride) is 2,2-bis[4-(3,4-dicarboxyphenoxy)phenyl]propane dianhydride.

3. A method in accordance with claim 1, where the organic diamine is metaphenylene diamine.

4. A method in accordance with claim 1, where the sodium salt is sodium acetate.

5. A method in accordance with claim 1, where the catalyst is sodium phthalate.

6. A method in accordance with claim 1, where the catalyst is potassium phthalate.

7. A method in accordance with claim 1, where the catalyst is zinc acetate.

8. A method in accordance with claim 1, where the catalyst is lithium caproate.

9. A method in accordance with claim 1, where the polymerization is effected under solution conditions.

10. A method in accordance with claim 1 where the polymerization is effected in the presence of o-dichlorobenzene.

* * * * *